(12) United States Patent
Fiumi

(10) Patent No.: US 8,749,618 B2
(45) Date of Patent: Jun. 10, 2014

(54) DISTRIBUTED THREE-DIMENSIONAL VIDEO CONVERSION SYSTEM

(76) Inventor: Morgan Fiumi, Santa Monica, CA (US)

( * ) Notice: Subject to any disclaimer, the term of this patent is extended or adjusted under 35 U.S.C. 154(b) by 338 days.

(21) Appl. No.: 13/158,288

(22) Filed: Jun. 10, 2011

(65) Prior Publication Data

US 2012/0314025 A1     Dec. 13, 2012

(51) Int. Cl.
*H04N 15/00* (2006.01)
*H04N 13/00* (2006.01)

(52) U.S. Cl.
USPC ..................................... 348/43; 348/E13.068

(58) Field of Classification Search
CPC ................. H04N 13/0055; H04N 19/00769; H04N 13/0239; H04N 13/0059; H04N 13/0048
See application file for complete search history.

(56) References Cited

U.S. PATENT DOCUMENTS

| | | | |
|---|---|---|---|
| 5,027,406 A | 6/1991 | Roberts et al. | |
| 6,325,632 B1 | 12/2001 | Chao | |
| 6,502,233 B1 | 12/2002 | Vaidyanathan et al. | |
| 6,832,189 B1 | 12/2004 | Kanevsky et al. | |
| 6,954,894 B1 | 10/2005 | Balnaves et al. | |
| 7,050,550 B2 | 5/2006 | Steinbiss et al. | |
| 7,346,507 B1 | 3/2008 | Natarajan et al. | |
| 7,665,020 B2 | 2/2010 | Simonyi | |
| 7,848,926 B2 | 12/2010 | Goto et al. | |
| 7,937,688 B2 | 5/2011 | Vaidyanathan et al. | |
| 7,941,317 B1 | 5/2011 | Goffin et al. | |
| 8,117,542 B2 | 2/2012 | Radtke et al. | |
| 8,161,386 B1 | 4/2012 | Mark | |
| 8,185,866 B2 | 5/2012 | Hawley et al. | |
| 2001/0051913 A1 | 12/2001 | Vashistha et al. | |
| 2002/0049778 A1 | 4/2002 | Bell et al. | |
| 2002/0095582 A1 | 7/2002 | Peled et al. | |
| 2002/0116716 A1 | 8/2002 | Sideman | |
| 2002/0167939 A1 | 11/2002 | Weissman-Berman et al. | |
| 2003/0012347 A1 | 1/2003 | Steinbiss et al. | |
| 2003/0212589 A1 | 11/2003 | Kish | |
| 2004/0048233 A1 | 3/2004 | Matthews | |
| 2004/0191744 A1 | 9/2004 | Guirguis | |
| 2005/0183109 A1 | 8/2005 | Basson et al. | |
| 2005/0216331 A1 | 9/2005 | Ahrens et al. | |
| 2005/0240916 A1 | 10/2005 | Sandrew | |
| 2005/0273381 A1 | 12/2005 | Thomas | |
| 2006/0084417 A1 | 4/2006 | Melpignano et al. | |
| 2006/0228689 A1 | 10/2006 | Rajaram | |
| 2007/0020604 A1 | 1/2007 | Chulet | |

(Continued)

FOREIGN PATENT DOCUMENTS

WO    WO2009/132871    5/2009

OTHER PUBLICATIONS

U.S. Appl. No. 13/158,274, filed Jun. 10, 2011, Distributed Digital Video Processing System.

(Continued)

*Primary Examiner* — Dave Czekaj
*Assistant Examiner* — Nam Pham
(74) *Attorney, Agent, or Firm* — Knobbe Martens Olson & Bear LLP

(57) ABSTRACT

A project network application can provide functionality for a plurality of worker systems to perform digital video editing so as to at least partially perform two- to three-dimensional conversion of a video. The project network application may, for instance, include tools for performing rotoscoping, depth mapping, object offsetting, occlusion filling, and the like.

24 Claims, 13 Drawing Sheets

(56) References Cited

U.S. PATENT DOCUMENTS

| | | | |
|---|---|---|---|
| 2007/0043525 A1 | 2/2007 | Brown et al. | |
| 2007/0111184 A1 | 5/2007 | Sperle | |
| 2007/0143103 A1 | 6/2007 | Asthana et al. | |
| 2007/0288663 A1 | 12/2007 | Shear | |
| 2008/0040111 A1 | 2/2008 | Miyamoto et al. | |
| 2008/0222734 A1 | 9/2008 | Redlich et al. | |
| 2008/0243499 A1 | 10/2008 | Poi | |
| 2009/0009661 A1 | 1/2009 | Murakami et al. | |
| 2009/0204471 A1 | 8/2009 | Elenbaas et al. | |
| 2009/0207020 A1 | 8/2009 | Garnier et al. | |
| 2009/0240736 A1 | 9/2009 | Crist | |
| 2009/0292539 A1* | 11/2009 | Jaroker | 704/235 |
| 2010/0080528 A1 | 4/2010 | Yen et al. | |
| 2010/0178956 A1 | 7/2010 | Safadi | |
| 2010/0223615 A1 | 9/2010 | Cross | |
| 2011/0066469 A1 | 3/2011 | Kadosh | |
| 2011/0161077 A1 | 6/2011 | Bielby | |
| 2011/0282795 A1 | 11/2011 | Kadosh | |
| 2012/0029978 A1 | 2/2012 | Olding et al. | |
| 2012/0162363 A1* | 6/2012 | Huang et al. | 348/43 |

OTHER PUBLICATIONS

U.S. Appl. No. 13/158,331, filed Jun. 10, 2011, System for Generating Captions for Live Video Broadcasts.

U.S. Appl. No. 13/740,001, filed Jan. 11, 2013, Distributed Vide Enhancement System.

U.S. Appl. No. 13/747,817, filed Jan. 9, 2013, Media Hub System for Video Production.

Pond, "Hollywood Outsources DVD Captions to . . . India?", published Apr. 27, 2010 on http://www.therwrap.com/movies/print/16727.

Meinedo et al., Evaluation of a Live Broadcast News Subtitling System for Portuguese, in proceeding of: INTERSPEECH 2008, 9th Annual Conference of the International Speech Communication Association, Brisbane, Australia, Sep. 22-26, 2008, in 4 pages.

Marks et al. "A distributed live subtitling system," BBC R&D White Paper, Sep. 2003, in 13 pages.

Nikse.dk, Subtitle Edit 3.2 Help, http://www.nikse.dk/SubtitleEdit/help, printed on Nov. 26, 2011, in 14 pages.

* cited by examiner

≡ Rotoscoping-Work Force　　　　　　　　　　　　　　　　　　Log In or Register

Home　Solutions　Services　Demo　Support　About Us

Register

Salutation *
[Mr ▼]

First Name *
[Alex]

Last Name *
[Smith]

Date of birth *
[1985-01-05]

Email address *
[asmith@gmail.com]

Password *
[　　　　　]

Confirm password *
[　　　　　]

Country *
[Bhutan ▼]

City *
[Thimphu ▼]

Photoshop experience *
[expert ▼]

Video editing experience *
⦿ Yes　◯ No

Computer equipment *
◯ Mac　⦿ PC

Home Internet *
⦿ Yes　◯ No

Connection type *
[Dialup ▼]

SignUp 600, 610

700 — Add new project

Code  Name  Client  Delivery date

Code:
Name:
Client: Moatez client name
Delivery date:
Image:

710

May 2011

| S | M | T | W | T | F | S |
|---|---|---|---|---|---|---|
| 18 | 24 | 25 | 26 | 27 | 28 | 29 | 30 |
| 19 | 1 | 2 | 3 | 4 | 5 | 6 | 7 |
| 20 | 8 | 9 | 10 | 11 | 12 | 13 | 14 |
| 21 | 15 | 16 | 17 | 18 | 19 | 20 | 21 |
| 22 | 22 | 23 | 24 | 25 | 26 | 27 | 28 |
| 23 | 29 | 30 | 31 | 1 | 2 | 3 | 4 |

Insert Cancel

Sunday, January

Monday, January

| Worker | | | | | |
|---|---|---|---|---|---|
| | Code | Name | Client | Delivery date | Creation date |
| | 000001 | rose1 | Moatez client name | Sunday, January 01,2012 | Tuesday, April 19,2011 |

☑2 ☐5 ☐8 ☑11 ☐14 ☐17 ☐20 ☐23  Go to Roto
☑3 ☐6 ☐9 ☑12 ☐15 ☐18 ☐21 ☐24
Frame 001 ☑4 ☐7 ☐10 ☐13 ☐16 ☐19 ☐22 ☐25

☐33 ☐36 ☐38 ☑40 ☑42 ☐44 ☑55 ☐56  Go to Roto
☐34 ☐37 ☐39 ☐41 ☐43
Frame 035

☐45 ☐46 ☑48 ☑49 ☐50 ☐51 ☐53  Go to Roto
Frame 047

*FIG. 9*

DISTRIBUTED THREE-DIMENSIONAL VIDEO CONVERSION SYSTEM

BACKGROUND

It is common in the technology sector, as well as in other areas of the business community, for companies to attempt to increase profits by directly or indirectly outsourcing certain projects to areas of the world that have an abundant supply of cost-effective labor. However, despite having the benefits of more cost-effective labor, many outsourcing projects fail to deliver the promised cost savings and produce an inferior result.

One of the main problems encountered in outsourcing has more to do with the management of the labor than the skills of the remote workers. Many projects are managed with little oversight or feedback, resulting in subpar work that must be revised or, in some cases, redone. Another problem facing companies is a difficulty in selecting qualified remote workers for a given task.

SUMMARY

In certain embodiments, a method of performing computer-aided video image processing includes receiving a video including a plurality of frames and providing a network application having functionality for allocating the frames of the video to worker systems operated by a plurality of workers over a network. The network application can output a digital video editor user interface having functionality for the workers to perform at least a part of a two-dimensional to three-dimensional conversion process on the video. This two-to-three dimensional conversion process can include performing two or more of the following: rotoscoping, depth mapping, occlusion filling, pixel shifting, three dimensional modeling, and camera matching. Further, the network application can collect processed frame information from the worker systems. The method may also include providing the processed frame information to a provider of the video as part of at least partially two-dimensional to three-dimensional converted video, where at least said providing the network application is implemented by a computer system having computer hardware.

Various embodiments of a system for computer-aided video image processing can include a network application having computer hardware. The network application can include functionality for allocating frames of a video to worker systems operated by a plurality of workers over a network. The network application can output a digital video editor user interface having functionality for the workers to perform at least a part of a two-dimensional to three-dimensional conversion process on the video. The two-to-three dimensional conversion process can include performing two or more of the following: rotoscoping, depth mapping, occlusion filling, pixel shifting, three dimensional modeling, and camera matching, and collect processed frame information from the worker systems. The system may further include a project management module that can provide the processed frame information to a provider of the video as part of at least partially two-dimensional to three-dimensional converted video.

Furthermore, in certain embodiments, non-transitory physical computer storage having instructions stored thereon for implementing, in one or more processors, operations for performing computer-aided video image processing can include receiving a video having a plurality of frames and providing a network application having functionality for allocating the frames of the video to worker systems operated by a plurality of workers over a network. The network application can output a digital video editor user interface having functionality for the workers to perform at least a part of a two-dimensional to three-dimensional conversion process on the video. The two-to-three dimensional conversion process can include performing two or more of the following: rotoscoping, depth mapping, occlusion filling, pixel shifting, three dimensional modeling, and camera matching. Further, the network application can collect processed frame information from the worker systems. The operations can also include providing the processed frame information to a provider of the video as part of an at least partially two-dimensional to three-dimensional converted video, where at least said providing the network application is implemented by a computer system having computer hardware.

The systems and methods described herein can be implemented by a computer system comprising computer hardware. The computer system may include one or more physical computing devices, which may be geographically dispersed or co-located.

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

The features of embodiments of the inventions disclosed herein are described below with reference to the drawings. Throughout the drawings, reference numbers are re-used to indicate correspondence between referenced elements. The drawings are provided to illustrate embodiments of the inventions described herein and not to limit the scope thereof.

FIGS. 6-12 illustrate example embodiments of user interfaces that can be used to implement digital video processing projects.

DETAILED DESCRIPTION

I. Introduction

This disclosure describes example embodiments of an adaptive workflow system. Certain embodiments distribute work objects or pieces and dynamically evaluate the performance of workers, including outsourcing workers. The adaptive workflow system can provide higher priority or more desirable projects and/or larger quantity of projects to workers that have relatively higher rated performance and have time availability. Further, the adaptive workflow system can provide other benefits to workers with higher rated performance, such as higher pay, more time off, and so forth. As a result, the adaptive workflow system can motivate improved performance among workers and can identify higher performing workers, thereby reducing costs and increasing quality of outsourced projects. Certain embodiments divide a project into smaller tasks to thereby provide greater flexibility in distributing the project among a plurality of works and to further enhance security as a single worker does not have access to the complete project or other work pieces included therein.

The adaptive workflow system can be used to implement digital video processing projects, such as two-dimensional to three-dimensional conversion projects, digital restoration, color adjustment, or the like. The features of the adaptive workflow system can also be implemented for other types of projects, including projects unrelated to video processing.

Although this disclosure is described primarily in the context of outsourcing projects to remote workers, such as workers in a foreign country, the features described herein can also be applied to provide projects to workers within a country native to a company's business and/or to distribute work tasks within a company, on a non-outsourced basis, to employees of the company. Further, the features described herein can also be applied to provide projects to workers who are both native to the company's business and workers from other countries. More generally, the term "outsourcing" and its derivatives, in addition to having their ordinary meaning, can refer to providing a project to any workers who are not employees of the company that provides the project, including independent contractors, consultants, and the like.

II. Example Adaptive Workflow Systems

Figure 1:
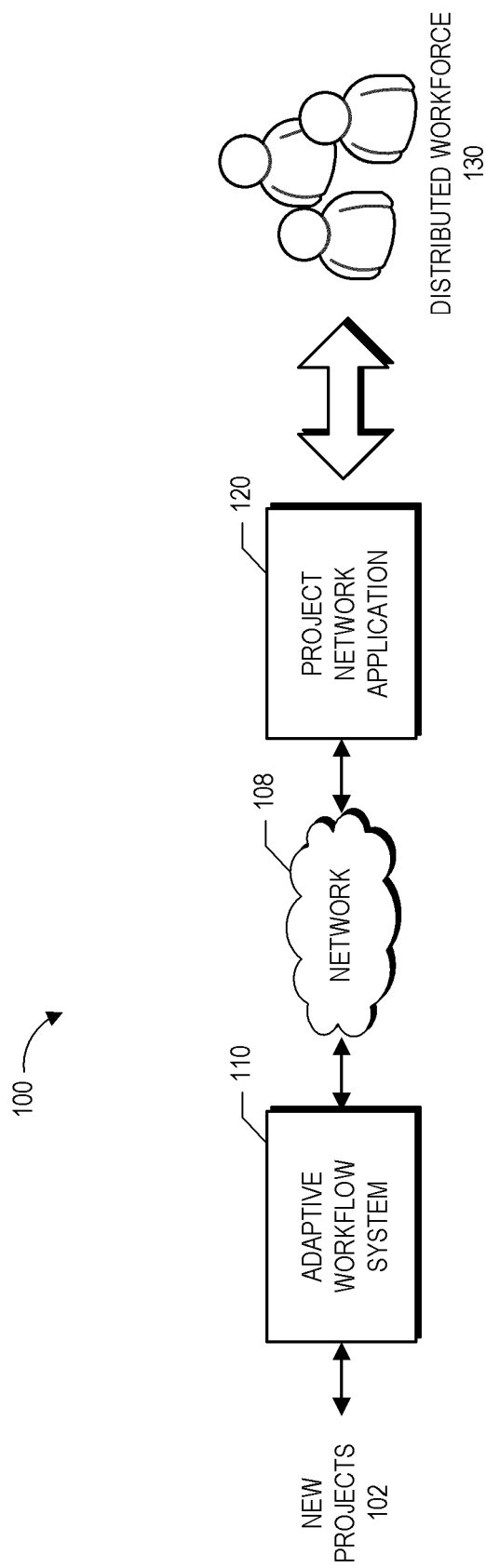
FIG. 1 illustrates an example embodiment of a computing environment for adaptively outsourcing projects to a distributed workforce.

FIG. 1 illustrates an embodiment of a computing environment 100 for adaptively outsourcing or otherwise providing new projects 102 to a distributed workforce 130. In the computing environment, new projects 102 are provided to an adaptive workflow system 110 by a customer of the provider of the adaptive workflow system 110. It is understood that in certain embodiments, the provider of the adaptive workflow system 110 may be the same entity as the entity providing new projects for the distributed workforce. The projects 102 may be in the form of instructions and associated digital files, such as video files (which may include audio tracks), received over a network from a customer computer system and then stored in an adaptive workflow system data store. The network may be a local area network (LAN), a wide area network (WAN), such as the Internet, combinations of the same, or the like. For example, the network 108 can include an organization's private intranet, the public Internet, or a combination of the same. The adaptive workflow system 110 adaptively assigns the new projects 102 to members of a distributed workforce 130 based on one or more of the following criteria:

past performance;
time availability;
skill set (e.g., experience with certain types and/or brands of software image editing tools);
willingness to help other workers in the distributed workforce (e.g., willingness to review the work of other workers, willingness to provide suggestions to other workers on how to perform one or more tasks);
geographical location (e.g., physical location, location within a specified country);
worker time zone;

customer specifications (e.g., where the customer may specify that workers from certain countries or regions are not to be used for security or contractual reasons);
improper copying or disclosure of a work piece;
other criteria.

These workers 130 access the projects 102 with a project network application 120 using, for example, personal computer systems or the like. Advantageously, in certain embodiments, because the adaptive workflow system 110 assigns projects based at least in part on past worker 130 performance, project quality may be enhanced and project completion costs may be reduced.

Some examples of projects 102 that can be received by the adaptive workflow system 110 include digital video editing projects and the like, such as projects to edit movies, television shows, video games (e.g., video sequences in video games), and the like. Examples of digital video editing or processing projects can include two-dimensional to three-dimensional conversion projects, digital restoration, color adjustment, or the like. Two- to three-dimensional conversion can be accomplished by rotoscoping and/or camera tracking, among other techniques. Digital restoration can include such techniques as fixing frame alignment, fixing color and lighting (e.g., to correct flicker and slight color changes between frames due to aging), restoring areas blocked by dirt and dust by using arts of images in other frames, restoring scratches, reducing film grain noise, and the like. Additional examples of video editing techniques include color correction, color balancing, color mapping, and color grading. For illustration purposes, the remainder of this application focuses on rotoscoping as an illustrative example of video editing techniques. However, the features described herein can be equally applied to other video editing techniques as well.

Videos are typically composed of frames of still pictures, which when displayed in rapid succession, give the illusion of motion. Videos may include one or more audio tracks which may include synchronization information used to synchronize the audio tracks with the successive display of frames. This subdivision of a video into multiple frames facilitates a division of labor in editing videos. Thus, the adaptive workflow system 110 can, automatically and/or with manual operator intervention, divide the frames of a video amongst the distributed workforce 130 so as to enable parallel processing (or substantially parallel processing) of video editing tasks by respective works. For example, the adaptive workflow system 110 can send each worker is a selected plurality of workers one or more scenes comprising multiple frames, portions of scenes (such as shots), portions of shots, or even individual frames for processing. Using a distributed workforce 130 in this manner can reduce the time to deliver a finished video editing project as compared to having a single worker or a small group of workers serially work on the video.

The adaptive workflow system 110 can provide video frames to the project network application 120 over a network 108, which may be a local area network (LAN), a wide area network (WAN), the Internet, combinations of the same, or the like. For example, the network 108 can include an organization's private intranet, the public Internet, or a combination of the same. The project network application 120 can be a web application hosted by the adaptive workflow system, another system (e.g., a third party computing and storage cloud operator), The project network application 120 can be hosted on the workers' personal computing device, or other hosted application that workers 130 can access with a browser or other client software or interface. The project network application 120 can include tools for editing videos, such as rotoscoping tools, digital restoration tools, color adjustment tools, and the like. In certain embodiments, the work pieces provided to the workers 130, such as the digital video/frame files, may be stored on a cloud based storage system, and worker-generated task results (e.g., metadata produced as a result of a worker performed task) may likewise be stored on cloud based storage system.

The adaptive workflow system can calculate performance ratings for the workers 130 based on their performance on the projects 102. When a worker is a new worker without a record of past performance on projects, the performance rating may be based on testing performed when the worker registered with the adaptive workflow system (e.g., where the user is given a sample project, such as a small number of frames to rotoscope) and the worker's associated test performance. In addition or instead, a new worker's performance rating may be based in whole or in part on the worker's claimed skills or familiarly with one or more types of software applications (e.g., editing applications), such as may be provided during a worker registration process. Advantageously, in certain embodiments, the adaptive workflow system 110 can provide higher priority or more desirable projects 102 and/or relatively larger amounts of work to workers 130 that have higher rated performance. Further, the adaptive workflow system 110 can provide other benefits to workers 130 with higher rated performance, such as higher pay per unit of work (e.g., per frame or other work piece processed, per hour worked, etc.), more time off, and so forth. As a result, the adaptive workflow system 110 can motivate improved performance among workers and can identify higher performing workers to send work to, thereby reducing costs and increasing quality of the projects 102.

Additionally, the adaptive workforce system 110 can provide security features for reducing the risks of potential copyright infringement or disclosure of confidential information by the workers 130. These and other features of the adaptive workflow system 110 are described in greater detail below.

Figure 2:
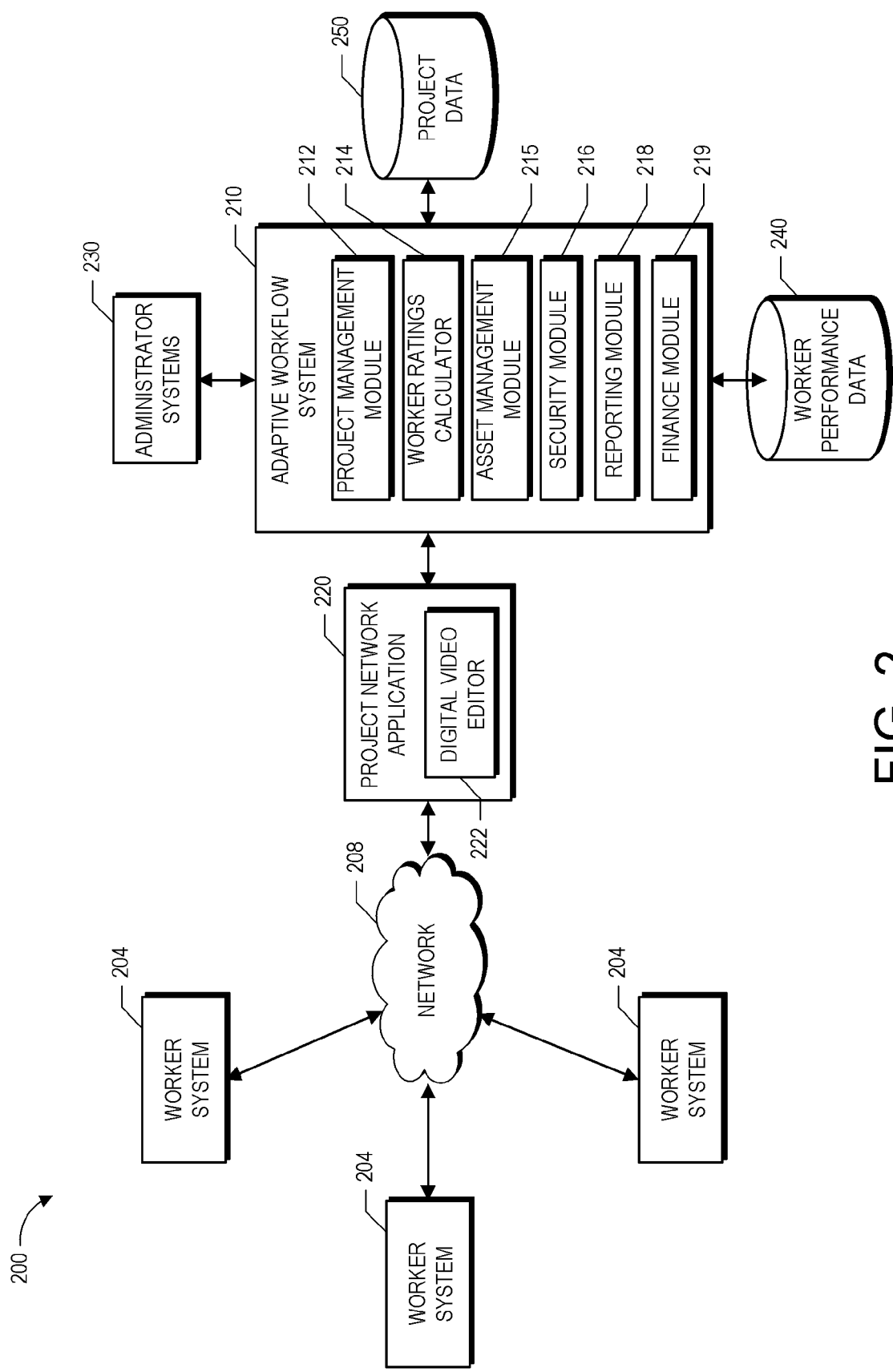
FIG. 2 illustrates a more detailed example embodiment of a computing environment for adaptively outsourcing projects to a distributed workforce.

FIG. 2 illustrates a more detailed embodiment of a computing environment 200 for adaptively outsourcing projects to a distributed workforce. The computing environment 200 includes the components of FIG. 1, such as an adaptive workflow system 210, a project network application 220, and a network 208. These components can have the same functionality as described above, as well as further functionality as described below. Worker systems 204, operated by workers of the distributed workforce 130 (see FIG. 1), communicate with the project network application 220 over the network 208.

In general, the worker systems 204 can include any type of computing device capable of executing one or more applications and/or accessing network resources. For example, the worker systems 204 can be desktops, laptops, netbooks, tablet computers, smartphones or PDAs (personal digital assistants), servers, or the like. The worker systems 204 include software and/or hardware for accessing the project network application 220, such as a browser or other client software.

As described above, the project network application 220 can provide, via a web site, one or more applications for editing videos. A digital video editor 222 is shown as part of the project network application 220, which can provide tools for rotoscoping or performing other editing tasks, such as those discussed elsewhere herein. In certain embodiments, the digital video editor 222 can incorporate features of currently available digital video editing software, except implemented in a network application. In other embodiments, the digital video editor 222 can be a downloadable or otherwise installable component that is installed directly on the worker systems 204. Thus, the digital video editor 222 can be a thick client or the like that communicates between the worker systems 204 and the adaptive workflow system 210 over the network 208.

The project network application 220 can include other features besides digital video editing features. For instance, the project network application 220 can include web applications or the like that enable workers to initially register with the adaptive workflow system 210, receive training, and track progress.

Both the project network application 220 and the adaptive workflow system 210 can execute on one or more computing devices, such as one or more physical server computers. In implementations where the project network application 220 or the adaptive workflow system 210 is implemented on multiple servers, these servers can be co-located or can be geographically separate (such as in separate data centers). In addition, the project network application 220 or the adaptive workflow system 210 can be implemented in one or more virtual machines that execute on a physical server. Further, the project network application 220 and/or the adaptive workflow system 210 can be hosted in a cloud computing environment, such as in the Amazon Web Services (AWS) Elastic Compute Cloud (EC2).

The adaptive workflow system 210 is depicted as including several components or modules. These components enable the adaptive workflow system 210 to perform a variety of functions. However, in various implementations, one or more of the components shown may be omitted from the adaptive workflow system 210 or other components may be included. Each of the components shown can be implemented in hardware and/or software. In addition, the adaptive workflow system 210 communicates with data repositories 240, 250 that include physical, non-transitory computer storage (e.g., magnetic, optical, volatile and/or nonvolatile semiconductor memory) for storing data related to operations of the adaptive workflow system 210, such as worker data 240 and project data 250. Further, administrator systems 230 can communicate with the adaptive workflow system 210 to adjust operations of the adaptive workflow system 210 in ways that will also be described in detail below.

A project management module 212 of the adaptive workflow system 210 provides functionality for managing video editing projects. The project management module 212 can output one or more user interfaces, provided for display to and accessible by the worker systems 204 and/or the administrator systems 230. These user interfaces can provide functionality for features such as project intake, project assignment to workers, quality control review, and the like.

For example, an administrator system 230, operated by an administrator of the provider of the adaptive workflow system 210 and/or an authorized customer operator, can access the project management module 212 to start new projects. An administrator can specify different attributes of a project, such as its name, due date, security level (described below), and the like. Further, the administrator can select workers to assign to the project or can select workers to whom the project will be made available. In general, workers can be assigned to projects and/or can be given the opportunity to select projects. Advantageously, in certain embodiments, the selection of workers to receive projects can be based, in whole or in part, on the users' performance ratings, so that higher rated workers are given preference for projects, thereby promoting project quality and reduced costs. As discussed elsewhere herein, other criteria may be used to select workers (e.g., time availability, location, time zone, customer specifications, etc.).

Performance ratings are calculated by the worker ratings calculator 214. The worker ratings calculator 214 may, but need not, use a multi-factored approach to adjust user ratings. These factors can include objective factors, such as whether a worker completed a project on time, subjective factors, such as the quality of a worker's work, or both. In certain embodiments, the quality of the worker's work may be objectively determined, such as by an application or another worker that objectively analyzes the work. For example, a quality control application may analyze the results of a worker's rotoscoping of one or more frames and determines how accurately or precisely the worker traced objected within the one or more frames. By way of further example, a quality control application or another worker may analyze the results of a worker's removal of scratches may measuring how many scratches were present in a given frame before and after the worker performed a scratch removal process. Other examples of factors that the worker ratings calculator 214 can consider include thoroughness, professionalism, accuracy, a worker's availability, a worker's infrastructure (such as the quality of his computer system and/or network connection), a worker's rate (e.g., how much the user charges for the work), and the like. Yet another example of a performance factor can be a helpfulness factor, which can represent a degree to which a worker assists other workers. Information used in calculating a worker's performance may be accessed from the worker performance data repository 240. The project network application 220 may provide a social networking or collaborative functionality, which enables workers to post work-related questions, view work-related questions of other workers, and give answers. The system 210 may track, for a given worker, the number and/or type of such posted work-related questions, viewed work-related questions, and/or answered worked related questions. The helpfulness, and/or correctness of a worker's answers may be ranked by other workers (e.g., the worker that asked the question or other workers) and/or by an administrator. Workers that provide answers, particularly correct answers, may be given a higher helpfulness score than other workers that do not collaborate. Many other performance factors can be used in different embodiments. Examples of calculating worker performance ratings are described in greater detail below.

The adaptive workflow system 210 also includes an asset management module 215 in the depicted embodiment. The asset management module 215 enables administrators to manage where videos or portions of videos are stored, what format the videos are stored in, and so forth. The asset management module 215 can advantageously compress video files or portions thereof, in certain embodiments, so as to enable reductions in storage usage and more efficient transmission of video or images over a network. Typical raw or intermediate video files, such as .dpx (Digital Picture Exchange) files, can be very large and therefore impractical to render via a web-based application accessed by worker systems 204 and/or to transfer to the worker systems 204. Thus, compressing the files can make web-based editing and/or transmission to worker systems 204 more feasible. For example, the .dpx format may be used to represent the density of each color channel of a scanned negative film in an uncompressed, logarithmic image, where the gamma of the original camera negative is preserved as taken by a film scanner. In an example embodiment, the asset management module 215 compresses the frames of a video into a .tiff (Tagged Image File Format) format, JPEG format, PNG format, or the like. The asset management module 215 can use other forms of compression and other file formats, however.

The asset management module 215 can also manage the way that videos are stored in computer storage, e.g., in the project data repository 250. For example, the asset management module 215 can divide a video amongst multiple storage devices or systems to promote security. For example, the asset management module 215 could divide the frames of a movie into portions such that no greater than 20% of a video is on any one server at a given time. Thus, even if one server were to be compromised, any frames stolen from that server would be just a portion of an entire video. In another scenario, the asset management module 215 can ensure that no sequential content (or substantially no sequential content) is stored on a given server. In certain embodiments, the servers may be in geographically distributed areas (e.g., in different buildings, states, countries, etc.). Further, the asset management module 215 can encrypt the stored video data. As a result, the asset management module 215 provides potentially multiple server-side measures for protecting video data from theft or manipulation.

In an example embodiment, using a compressed version of the frames is possible because the workers perform task on the frames that do not change the content of the frames themselves and the workers do not require that the frames be at a very high resolution in order to perform their tasks. For example, rotoscoping can involve tracing over an image element (e.g., a person, a person's limb, or other object) in a frame, and the digital video editor 222 can save metadata associated with the tracing in a separate file from a frame. This metadata can include position information (such as X,Y coordinates) for the traces made to the frame. The worker systems 204 can therefore further reduce network bandwidth usage by transmitting the metadata as processed frame information over the network, rather than transmitting edited frames themselves. Further, because in certain instances the rotoscoping involve tracing over an image element, it may not be necessary for the non-border areas of the element to be very detailed. The project management module 212 can collate or otherwise organize the processed frame information for a video's frames and provide the processed frame information to a client system (not shown), thereby enabling clients of the provider of the adaptive workflow system 210 to use the processed frame information to create 3D effects, restore digital images, and so forth.

The security module 216 can provide one or more security measures designed to reduce the risk of copyright infringement, theft, or improper disclosure of video files. Further, these security measures can also include features for tracking the source of video theft. For example, the security module 216 can apply a digital watermark to one or more frames sent to worker systems 204. These watermarks can be visible or invisible to the naked eye. In one embodiment, the watermark identifies the worker who edited the frame. The watermark may contain a worker's name or other identifying information. The watermark may instead include an indirect reference to a worker, and this indirect reference can be used to identify which worker edited the frame. Upon finding that a frame has been provided to an unauthorized party (e.g. by the worker taking a photograph of the frame and then providing the photograph to an authorized party), a provider of the adaptive workflow system 210 can examine the watermark on the improperly distributed frame to determine the identity of the worker that shared the frame without permission. The provider of the adaptive workflow system 210 can then determine how to take corrective action with respect to the worker and to store a notation in the worker's account record regarding the improper copying or disclosure.

Moreover, the security module 216 can examine the worker systems 204 to confirm whether workers are sharing accounts with each other or with others. It can be desirable to prevent worker account sharing to reduce the risk of subcontracting (where a worker may improperly give a task assigned to the worker to another user to perform the task). When subcontracting occurs, the quality of projects can suffer as accountability is lost. For example, because the task is not being assigned based on the performance score of the person that is actually performing the task, the resulting quality may be less than expected. The security module 216 can identify users that log in from different locations simultaneously or substantially simultaneously (e.g., where a user logs-in in North America, and two hours later, logs-in in Asia or other location that it is impossible or unlikely for the authorized worker to have traveled to in a given amount of time), for instance, as a measure of identifying multiple workers sharing a single account. The security module 216 can also perform geo-filtering based on IP addresses to make this determination.

In one embodiment, the security module 216 encrypts frames, and the project network application 220 sends the encrypted frames to the worker systems 204. The worker systems 204 can decrypt the frames in order to process the frames and then encrypt the processed frame information for transmission to the project network application 220. However, if a frame is decrypted completely on a worker system 204, the frame is subject to be stolen. To prevent this theft, the worker system 204 can include client-side software in one embodiment that selectively decrypts a portion of a frame being worked on. The client-side software may, for instance, decrypt a quadrant of a frame or other portion of a frame. In response to a user completing work the frame and desiring to work on another portion of the frame, the client-side software may reencrypt the edited portion and decrypt another portion. Thus, in this manner, the frame can be better protected against theft.

The adaptive workflow system 210 also includes a reporting module 218 that can provide a user interface for administrator systems 230 to access statistics about workers, to allocate projects to workers, and the like. The reports can include such information as project status, workers' throughput, worker performance ratings, worker completion percentage of a particular project, worker availability, historical information and trends for the foregoing, and the like. An example reporting user interface is described below with respect to FIG. 12.

A finance module 219 of the adaptive workflow system 210 can include functionality for administrators to maintain financial information about workers, such as their rates. The finance module 219 can include accounts payable functionality for paying workers based on the quantity work performed and/or the quality of the work, as well as accounts receivable functionality for billing tasks to clients of the adaptive workflow system 210 provider.

III. Example Workflow Management Processes

Figure 3:
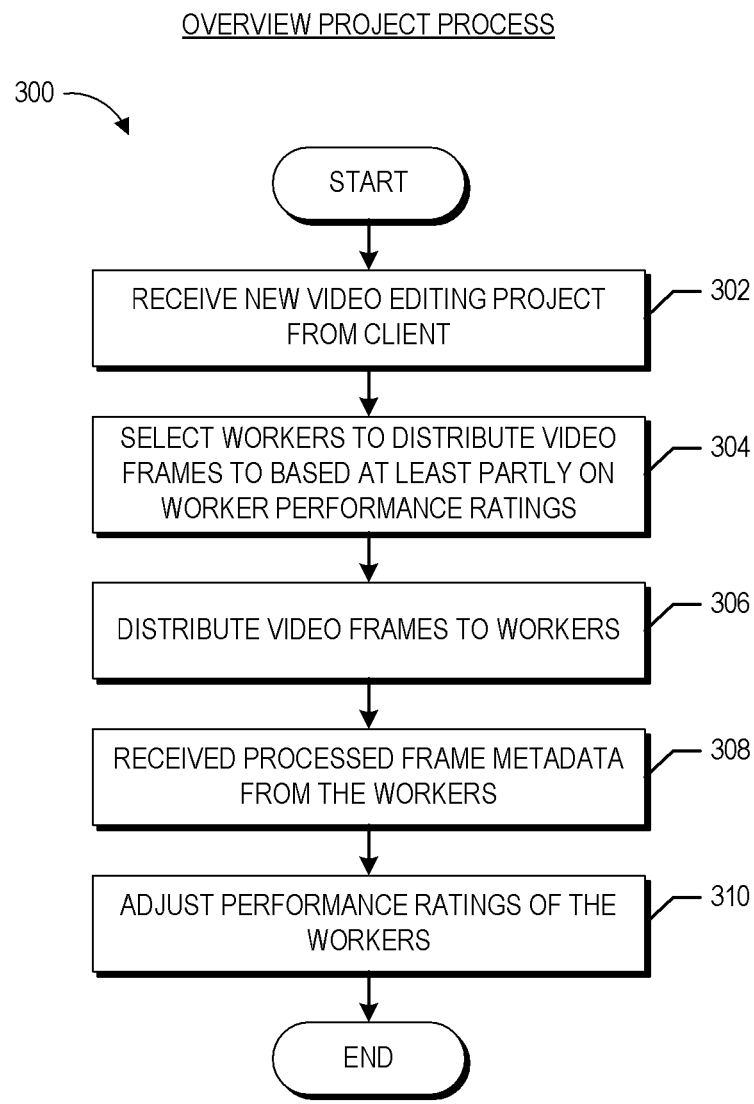
FIG. 3 illustrates an example embodiment of a project management process.

FIG. 3 illustrates an embodiment of a project management process 300. The project management process 300 can be implemented by any of the systems described above. For illustrative purposes, the process 300 will be described as being implemented by the project management module 212 of FIG. 2. The process 300 depicts an example overview of managing a distributed project, such as a video editing project.

The process 300 begins at block 302, where the project management module 212 receives a new video editing project from a client. This new video editing project can be a movie, television show, video game, or the like, or a portion thereof. At block 304, the project management module 212 selects workers to distribute video frames to based at least partly on performance ratings of the workers. In one embodiment, the project management module 212 assigns workers to a project based on their rating. In addition or instead, the project management module 212 notifies workers (e.g., via email, SMS, MMS, a webpage, and application, or otherwise) that a project is available, due to their performance rating, and the workers may choose whether to accept the work via a corresponding user interface.

The project management module 212 can use any of a variety of models for selecting workers for a particular project based on performance ratings. As an example scenario, the project management module 212 could determine tiers of workers based on their performance ratings. Workers in a higher tier could be given more choice or higher paying work versus workers in a lower tier. For example, if the worker ratings calculator 216 calculates performance ratings on a 0-100 scale, 100 being the highest possible score, the project management module 212 can select workers with a rating of 75 or above for the highest paying or most interesting work. The project management module 212 might select workers having a rating in the range of 50-75 for lower level work, which may pay less, have fewer hours, or be less interesting. Further, the project management module 212 might assign workers with a rating lower than 50 to receive additional training or for other remedial action by management. The scoring scales and tiers used in this example, however, are mere examples that could be varied in different implementations.

The project management module 212 distributes the video frames to the workers at block 306. For example, the project management module 212 can make the frames available for checkout by workers from the digital video editor 222 of the project network application 220. The project management module 212 can distribute frames based on performance ratings, worker throughput (see FIG. 4A), worker availability, other criteria discussed herein, or other factors. For instance, the project management module 212 can distribute more frames to workers that have higher quality ratings or to workers that have higher throughput (e.g., an amount of frames that the workers process in a given time period). The project management module 212 can also take into account workers' availability by assigning an amount of frames that a worker is able to complete in a given time.

In an example embodiment, the project management module 212 distributes frames in groups called shots. Each shot can represent one particular camera angle used in a scene. Multiple shots can constitute a scene, although a scene may also have only one shot. Each shot can include multiple frames. Some shots can be lengthy, in which case, the project management module 212 can divide the frames of a shot amongst multiple workers. In an example implementation, the project management module 212 assigns an initial frame of a shot, called a reference frame, to a more highly skilled worker. This worker may be one of the outsourced workers (e.g., such as a worker with a relatively high performance ranking) or may be an employee of the provider of the adaptive workflow system 210. This worker can perform edits based on the reference frame, such as rotoscoping tracing.

The digital video editor 222 can include tools for extrapolating the initial edits to the reference frame to subsequent frames in the shot. For instance, the digital video editor 222 can superimpose or extrapolate the tracing created in the reference frame to subsequent frames. The project management module 212 can then distribute the remainder of the frames in a shot to one or more other workers, who may edit the rough extrapolations of the digital video editor 222 to other frames. Sometimes, such as when an object moves across a frame during a shot, the workers may need to create a new reference frame in the middle of a shot. The digital video editor 222 can then allow a worker to extrapolate the new reference frame to one or more additional frames.

Processed frame metadata is received from the workers by the project management module 212 at block 308. This processed frame data can include coordinate data for rotoscoping projects or other metadata for other projects. In an example embodiment, the metadata is produced in a standardized format, such as .sfx files (silhouette files, used with software provided by www.silhouettefx.com) or Nuke files (used with software provided by www.thefoundry.co.uk/products/nuke). These standard formatted files can be used by clients to complete 3D or other video processing. Other formats may be used as well.

At block 310, performance ratings of the workers are adjusted to reflect their performance on editing the frames. Performance rating calculations are described below in greater detail with respect to FIG. 5.

Figure 4A:
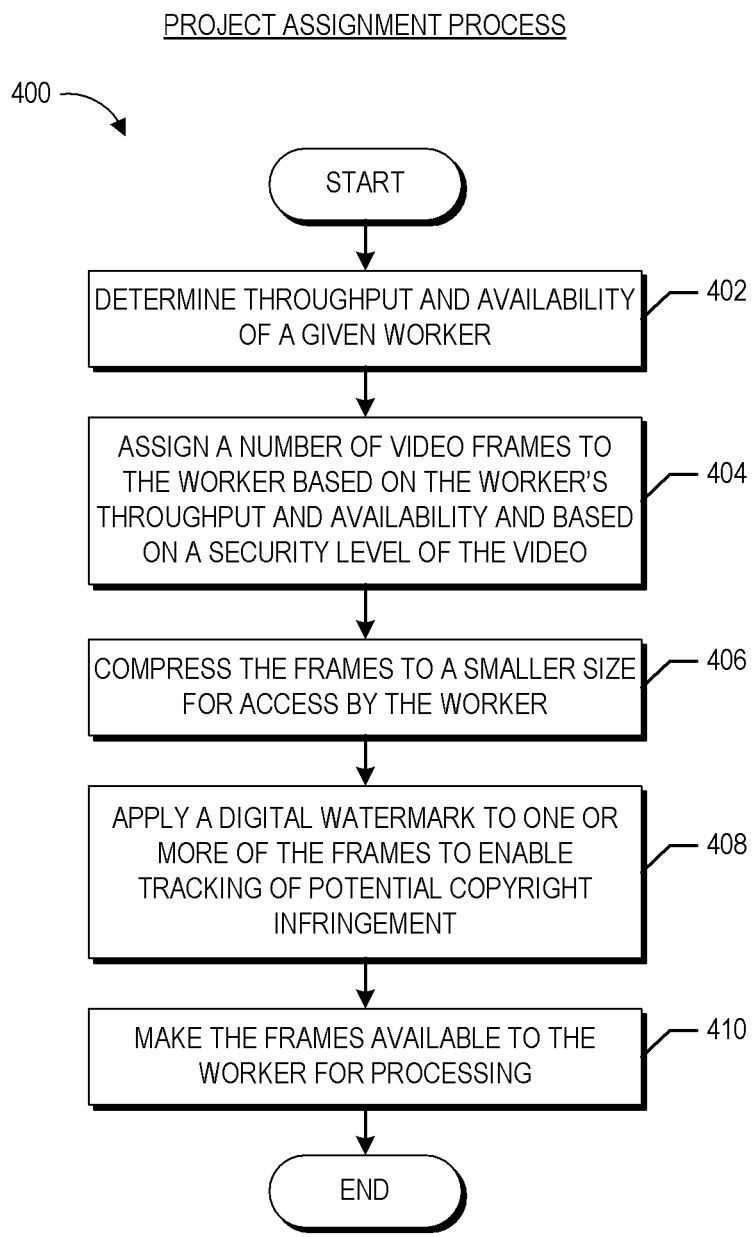
FIG. 4A illustrates an example embodiment of a project assignment process.

FIG. 4A illustrates an embodiment of a project assignment process 400. The project assignment process 400 can be implemented by any of the systems described above. For example, the process 400 will be described as being implemented by components of the adaptive workflow system 210 of FIG. 2, such as the project management module 212 and the security module 216. The process 400 depicts a more detailed embodiment of assigning or otherwise making available a video editing project to a distributed workforce.

The process 400 begins at block 402, where the project management module 212 determines the throughput of a given worker. A worker's throughput can be determined in one embodiment by calculating the worker's past completed frames in a given time frame, such as an hour. Further, at block 402, the project management module 212 determines the workers' availability. Workers can provide their availability in the form of a number of days, hours, or other time periods that the workers can accept work. The project management module 212 can access this information in order to determine which workers are able to accept work.

At block 402, the project management module 212 assigns a number of frames to the worker based on the throughput of the worker, the availability of the worker, as well as optionally based on the security level of the video. For workers with high throughput and high availability, the project management module 212 can assign a higher number of frames, and vice versa. In one embodiment, availability can also be included as a factor in a worker's performance calculation as well. Thus, for example, workers with higher availability can be given preference to users with lower availability. In another implementation, the project management module 212 uses workers' availability as a tiebreaker to decide to whom to assign work when two workers have the same or similar performance scores.

The security level of a video is also a factor in some embodiments in parceling out work. The security module 216 (or a user thereof) can assign security levels to videos based on a variety of criteria. One possible criteria is whether a video has been publicly released (e.g., for rent or purchase by the public). Videos, such as movies, that have not been released can be assigned a higher security level, as theft and improper distribution or disclosure of such a video could negatively impact box office receipts. Conversely, videos that have already been released may be assigned a lower security level. Further gradations are possible, such that a video that has been released to theaters but not on storage media (such as DVD) or via cable, download or streaming, can have a higher security level than movies that are no longer in theaters but are available for purchase or rent on storage media or via cable or downloading or streaming to a user terminal. Further, clients of the provider of the adaptive workflow system 210 can request a certain security level in some instances.

The project management module 212 can take a video's security level into account by dividing the video into smaller segments for high security videos and by using more workers to edit these segments than with a lower security video. Further, for higher security videos, the project management module 212 may not give sequential frames to workers but instead might provide every tenth frame or the like. The project management module 212 can also assign frames randomly to workers for higher security videos.

The project management module 212 compresses the frames at block 406 so that the frames will be of smaller size and therefore more accessible to the worker. Compression also provides another layer of security because compressed video may be less desirable to copy or steal than full-resolution video. At block 408, the security module 216 applies a digital watermark to one or more of the frames to enable tracking of potential copyright infringement or improper disclosure, as described above. At block 410, the project management module 212 makes the frames available to the worker for processing. For example, the project management module 212 can upload the frames to the project network application 220, from where the workers can download the frames to their worker systems 204 for editing or other processing.

Figure 4B:
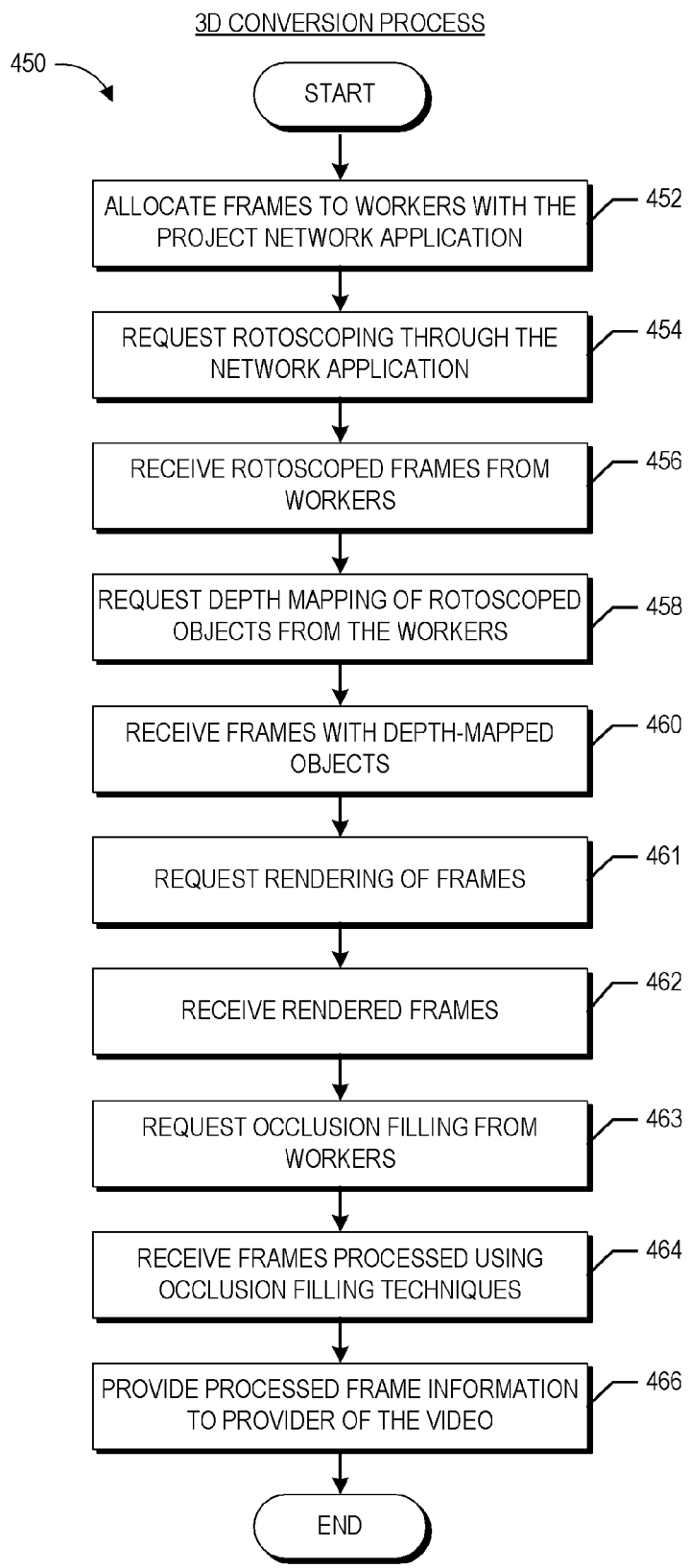
FIG. 4B illustrates an example embodiment of a three-dimensional conversion process.

FIG. 4B illustrates an embodiment of a two- to three-dimensional conversion process 450. The process 450 can be implemented by any of the systems described above. For example, the process 450 will be described as being implemented by components of the computing environment 200 of FIG. 2, such as by the project network application 220. The process 450 depicts an embodiment of two- to three-dimensional video conversion that can include such features as rotoscoping, depth mapping and offsetting, and occlusion filling. Other examples of two- to three-dimensional video conversion techniques are also described, as well as other digital video editing techniques.

The process 450 begins at block 452, where the project network application allocates frames to workers. The project network application 220 may, but need not, allocate the frames to workers based on performance ratings. In embodiments where performance ratings are considered, the project network application 220 can use any of the performance rating features described herein to allocate the frames.

The project network application 220 requests rotoscoping work through the network application at block 454. This request can be accompanied by the frames allocated to each worker. Alternatively, the project network application 220 can post a rotoscoping request, and interested workers can fulfill the request and check out frames from the project network application 220. The workers can perform rotoscoping using tools provided by the digital video editor 222 of the network application 220 as described elsewhere herein. Rotoscoped frames are received from the workers at block 456.

Rotoscoping can be used to identify one or more objects in a frame that will be further processed to create a three-dimensional or "3-D" effect. This 3-D effect may be performed in different ways, one of which is illustrated in FIG. 4B. For instance, in block 458, the project network application 220 requests workers to perform depth mapping of the rotoscoped objects. Depth mapping can include assigning grayscale values to pixels in an image, where the values correspond to desired depth. An object selected through rotoscoping, for instance, may be assigned different grayscale values than surrounding objects, thereby enabling subsequent processing to create a 3-D effect for the rotoscoped object.

In one embodiment, the project network application 220 assigns or requests a specialized worker to perform the depth mapping on a reference frame, similar to the reference frame processing that can be used for rotoscoping described above. For example, a stereographer can perform the initial depth mapping, using his or her judgment to estimate a proper depth of an object to create a desired 3-D effect. Other workers can use the depth-mapped reference frame to propagate depth-mapped effects to subsequent frames in a shot, scene, reel, or the like.

Once a frame is depth-mapped, rendering can be requested for the rotoscoped objects in the frame at block 461. Rendering can include pixel shifting or offsetting a copy of the objects in the frame by an amount that depends on the degree of depth-mapping. This offset of a second image can produce stereoscopic left eye and right eye images that, when viewed through a suitable optical medium such as stereoscopic lenses, can convey a stereoscopic or 3-D effect. Rendered frames are received by the network application 220 at block 462.

Offsetting of copied objects can create gaps or holes in frames that should be repaired to maintain image quality. A process called occlusion filling, in-filling, or in-painting can be used to fix the holes in the frames. Thus, at block 463, the network application requests workers to perform occlusion filling or the like. Related techniques that may be requested and performed instead of or in addition to occlusion filling may include matte painting and/or matte cleanup.

Frames processed using occlusion or other similar techniques are received at block 464. Processed frame information, which can include any subset of rotoscoped, depth-mapped, offset, and occlusion-filled frames can be provided to the provider of the video (e.g., client) at block 466. The provider of the video may perform further 3-D effects processing or may use the processed frame information as-is to implement a 3-D video.

In addition, in some embodiments, the digital video editor 222 can also output a user interface on a 3-D enabled display, thereby enabling a worker to evaluate the quality of the processed frame information. The distributed workers may be provided with such 3-D displays. In some embodiments, quality control workers are provided with 3-D displays. A combination of distributed workers and quality control workers may use 3-D displays.

Although not shown, in other embodiments, 3-D effects can be implemented using other techniques such as pixel shifting, camera matching, and 3-D modeling. Rotoscoping may be used with the pixel shifting and camera matching techniques. In some embodiments, rotoscoping can be a technique of manually creating a matte or mask for an element on a live-action plate so it can be composited over another background. Rotoscoping can be used to fix existing footage by rotoscoping out a popular cola product (for instance) with product placement or creating devilish eyes for a vampire in a scene, as another example. Rotoscoping is changing the direction of visual artists as much as sampling changed the direction of musicians.

Rotoscoping may be employed for such videos as trailers, promos, commercials, and music videos. Production companies repurpose or fix existing content because it is significantly cheaper than reshooting new content or it is impossible to recreate. For example, a car company changes the headlight of a car from one year to the next and by rotoscoping the old headlight out a new one can be inserted in an existing shot for a fraction of the cost of reshooting the scene. As another example, rotoscoping can be used to replace the product label of a product, or to remove the blood from the hands of an actress for a trailer to be shown on broadcast TV. Rotoscoping can also be used to create a promo using the existing footage of an actor in a sitcom who is no longer available to enhance viewership of its reruns. Rotoscoping can also be used to replace the background or clean up poorly shot green screen footage. Thus, rotoscoping is a heavily demanded technique in today's current production environment because it can be used in a number of ways.

Rotoscoping is very time consuming. It can take one artist 10 hours to cut out one or two seconds of rotoscoping depending on the complexity. Thus, distributing the rotoscoping process amongst many workers can greatly increase the efficiency and speed of the 3-D conversion process.

Camera tracking or match moving is another highly-demanded technique used in potentially any type of video, from feature films to commercials. It can be used to capture the movement of the camera in the scene or track an object in a scene. Corner Pinning or tracking of a screen in a shot is used frequently from sci-fi films or cell phone commercials. It is even used to replace buildings, billboards in period pieces, and the like. A more complex object tracking example is to track the mouth of an animal so that a composited mouth can be moved to its human narration.

Camera tracking has replaced computer controlled cameras in recreating a virtual camera in 3D space. The tracker determines the lens type, the height of the camera, and the direction it is pointing in relationship to other objects in the live action plate. Once this data is generated it is deposited into a 3D program so that digital characters, products, and objects can interact with the live characters or live action plate. The characters will have the same perspective and parallax so that it will match seamlessly with the live action plate background.

The final step in one embodiment is to composite the 3-D characters with the live action plate. An object such a street sign or a tree is often initially rotoscoped so that it can be placed in front of the creature as it crosses the frame. Thus, more than one technique may be used to create the final 3-D effect. A simple use of the camera matching technique is to add or enhance more flame in a scene or more water particles in a tsunami scene. The scene is safer for the actors but the explosion or tornado effect looks more intense in the final scene.

Further, other digital editing techniques that can be performed using the digital video editor 222 can include color correction, color grading, and the like. Color correction is often applied to the original footage of a video to correct any color balance or exposure issues. Color correction can be used particularly when a production uses different cameras in a scene. When the white and black balance on a camera has not been set correctly, for instance, the colors of the scene may be too blue, or too orange, or the like.

Especially when shooting with changing lighting conditions outside, these color errors can be detected in a scene. Color errors can also occur when shooting a scene over several days, and where one camera does not match the look of the first day. Camera mapping is used to copy the colors from one shot to another shot so that scene looks like it was shot in one day. Frequently a production team will hope to "fix it in post" not realizing the cost of correcting large amounts of material. Today's films are shot quickly with little or no extra time allotted for a reshoot.

This extra amount of color correction work has been assigned to the editor whose job actually has doubled. This also increases post production costs, not factored in when the budget was created. The editor might be brilliant as a story teller but maybe lacking in color correction skills. In contrast, using a distributed workforce, such as with any of the techniques described herein, a style frame can be used to define the color errors with the footage. The workforce can correct large amounts of footage quickly before the editor even touches the footage. Based on a digital intermediate workflow, digital film or video source footage can be corrected before it is ingested by the editor. Reels or camera clips can be color corrected and saved to a digital intermediate file. This file can be used by the Editor to create the master edit.

Color grading is a technique that effectively marries all of the disparate elements of the film and gives it its final tone or "look". An entire film or sections of a film can be subtlety graded to emotively carry the mood of the film. An extreme example of the use of grading would be The Wizard of Oz. The film would not have the same impact without the sepia toned scenes of Kansas.

Color grading can also be used for 3-D Computer Graphics whose detail and crispness standout from the surrounding footage. Color grading can smooth out and finishes these scenes so that they look like they were shot together. A director can define a style look per scene or act in the film. A distributed workforce using the techniques described herein can match the desired look based on defined technical criteria. For example, one might want to have a bleach bypass look, crushed blacks for a more high contrast dramatic look, a desaturated color look, a blue tint or a warmer look depending on the emotive content of the scene.

Figure 5:
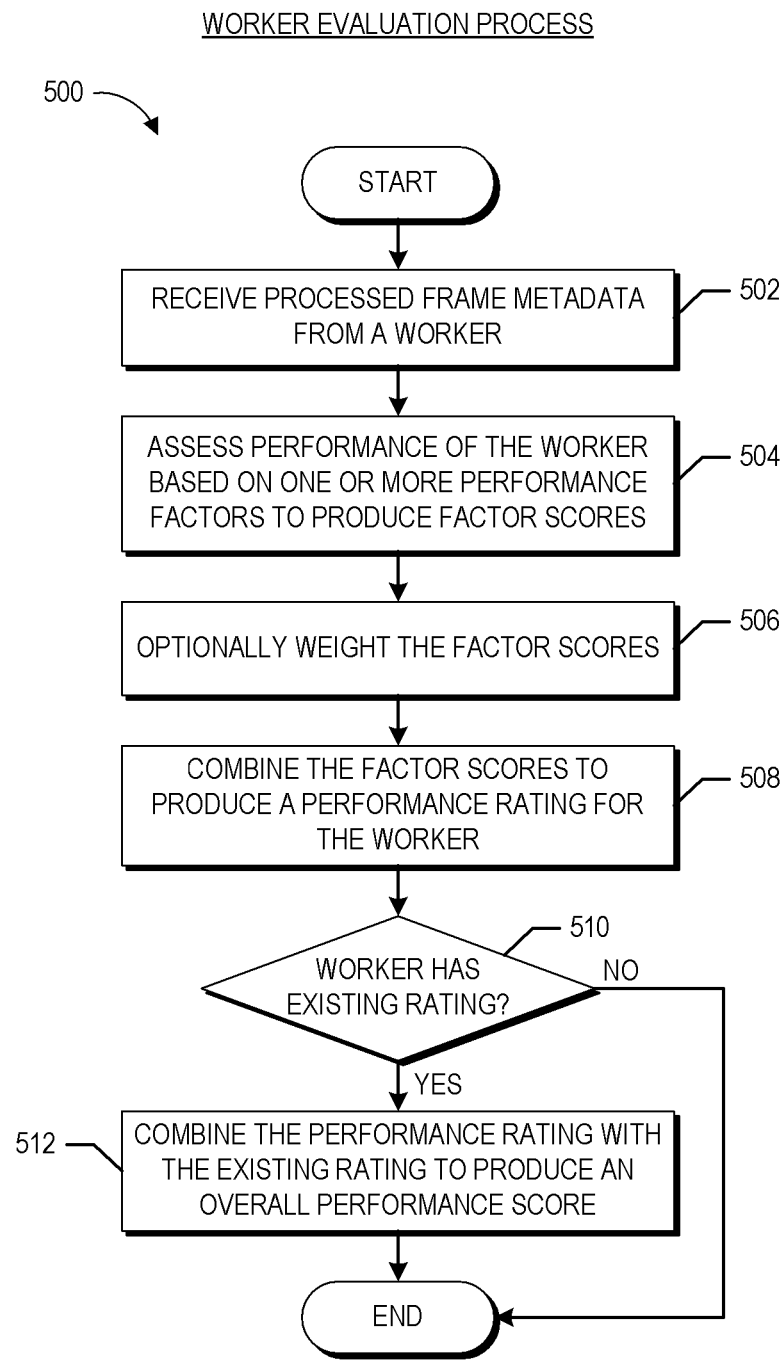
FIG. 5 illustrates an example embodiment of a worker evaluation process.

FIG. 5 illustrates an embodiment of a worker evaluation process 500. The worker evaluation process 500 can be implemented by any of the systems described above. For example, the process 500 will be described as being implemented, at least in part, by the adaptive workflow system 210 of FIG. 2. Specifically, aspects of the process 500 can be implemented by the project management module 212 and by the worker ratings calculator 214. The process 500 depicts an example embodiment for calculating worker performance ratings, which can advantageously be used to adjust the projects that are assigned or otherwise made available to workers.

The process 500 begins at block 502, where the project management module 212 receives processed frame metadata from a worker. At block 504, the worker ratings calculator 214 is used to assess the performance of the worker based on one or more performance factors, producing performance factor scores. As described above, these factors can include objective or subjective factors. The worker ratings calculator 214 can provide a user interface that enables a user, such as a quality control worker or administrative user, to enter one or more objective or subjective scores for the worker. The quality control worker, administrator, and/or application can evaluate whether the work was delivered timely, the quality of the work, and the like, among the other performance factors described above. The quality control worker, administrator, and/or application can assign numerical scores to each performance factor or category, or a subset thereof. Alternatively, non-numerical scores can be assigned, such as qualitative scores (e.g., "high performer," "average performer," "low performer," etc.). As discussed above, some or all of the scoring may be performed by an application. For example, the application may identify, via a time stamp, when a worker submitted a processed/finished work piece, and determine and score the timeliness of the completion by comparing the time stamp to a specified required or desired-by date and/or based on an amount of time that elapsed between the user being given the work piece and the submission of the processed work piece. By way of further example, the application may measure how well the worker performed a task, as similarly discussed above, and score the performance.

Additional ways for automatically assessing worker performance can include evaluating thoroughness, for example, by confirming whether a certain number of objects were rotoscoped out of a total number of requested rotoscoped objects. Color-based detection schemes may also be used to automatically assess user performance. Certain colors may bleed in an object if rotoscoping captures background color not associated with an object. This color bleed can be detected automatically and used to assess the quality of a worker's rotoscoping or the like.

The worker ratings calculator 214 optionally weights the factor scores at block 506. For instance, the worker ratings calculator 214 can provide a user interface that enables a quality control user or administrator to enter or adjust weights to be applied to the factors. Alternatively, the worker ratings calculator 214 applies internally stored weights to the factors, for example, by multiplying the factor scores by the weights. The weights to be applied to the performance factors can be driven by client desires, such as timeliness over accuracy or vice versa. The weights can be percentages that are multiplied by the performance factor scores. For instance, if there are five factors, the weights can be percentages that sum to 100%.

The factor scores are combined by the worker ratings calculator 214 at block 508 to produce a performance rating for the worker. If the worker has an existing rating, as determined at block 510, the performance rating calculated at block 214 is combined with the existing rating by the worker ratings calculator 214 to produce an overall performance score at block 512. Otherwise, the process 500 ends.

A worker's existing rating can be updated in one embodiment by combining the existing rating with the new performance score for a particular project. Because users can improve or decline in performance, a window of time may be used in which existing performance data is considered. For instance, a worker's overall performance score can be based on the past four weeks of performance data or some other time period. Optionally, the worker's score, scoring history, and/or scoring trends may be provided to a worker terminal for display to the worker, so that the worker can monitor and be motivated to improve their score. Optionally, the worker's score, scoring history, and/or scoring trends may be provided to an administrator terminal for display to the administrator.

IV. Example User Interfaces

FIGS. 6-12 illustrate embodiments of user interfaces 600-1200 that can be used to implement digital video processing projects. Certain of these user interfaces can be output by the project network application 220, while others are output by the project management module 212. The user interfaces can be accessed with browser software or other client software.

Referring specifically to FIG. 6, a registration user interface 600 is shown. The registration user interface 600 provides user interface controls 610 (such as fields, buttons, select boxes, or the like) for users to include demographic information, for listing their previous video editing experience, and for describing their computer equipment and network connection. Thus, the registration user interface 600 can be used to initially set up a worker with the adaptive workflow system 210. In addition, the computer equipment and network connection information, or infrastructure information, can be used by the worker ratings calculator 216 to calculate an infrastructure rating. Users that have better infrastructure can be favored over other users to receive projects. In some embodiments, the project network application 220 can also obtain worker infrastructure information, for example, by pinging user systems to determine latency, bandwidth, and the like, or by accessing user system information through a remote desktop session or the like. Some or all of the information collected via the registration user interface 600 may be used in generating an initial score for the user, which may then be used in distributing work tasks.

FIG. 7 illustrates a project intake user interface 700 that includes controls 710 that enable an administrator to initially start a project. A delivery date control 710 can be used to calculate due dates for workers to meet, which can be in turn used to calculate performance ratings based on timeliness.

Figure 8:
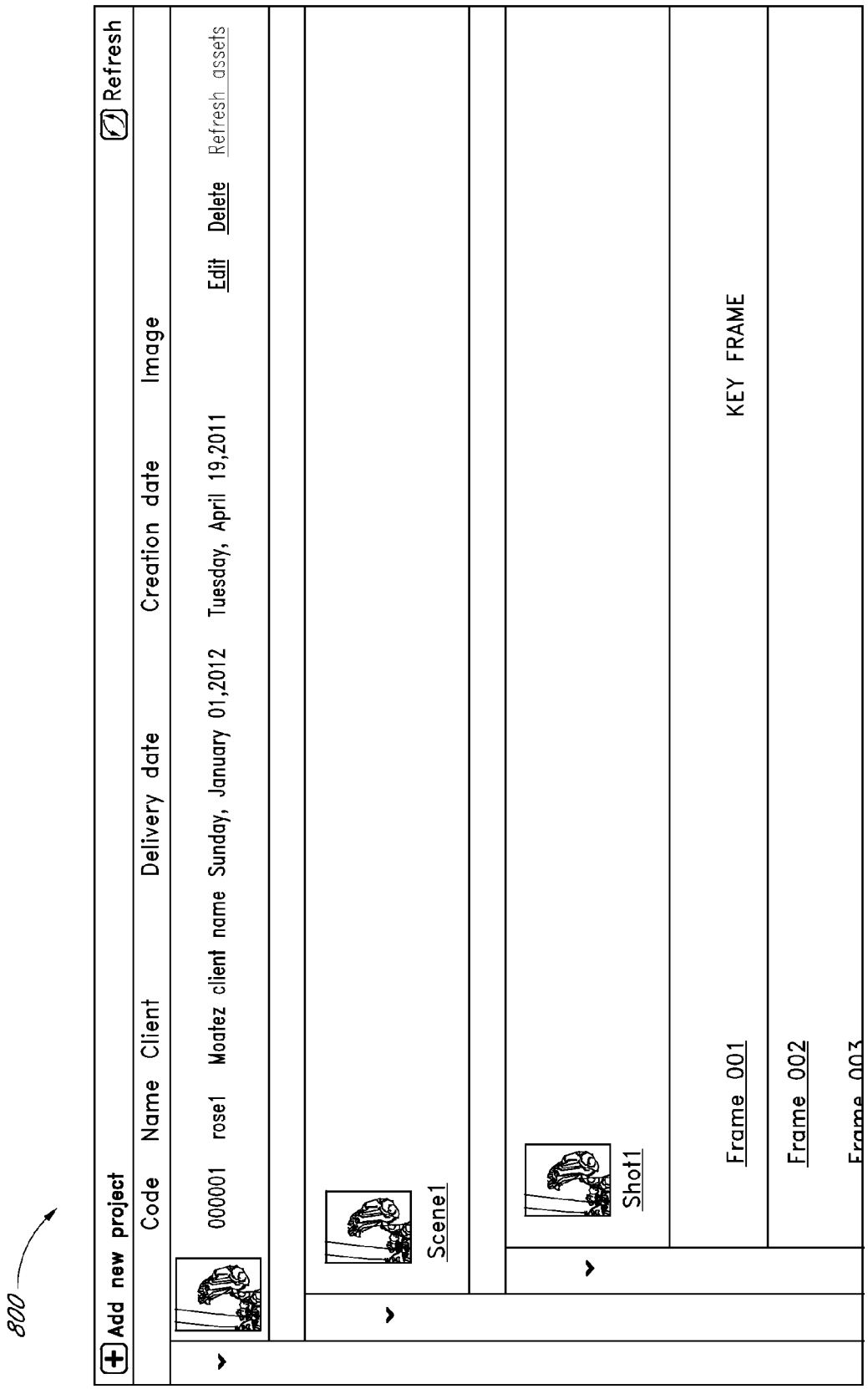
Figure 10:
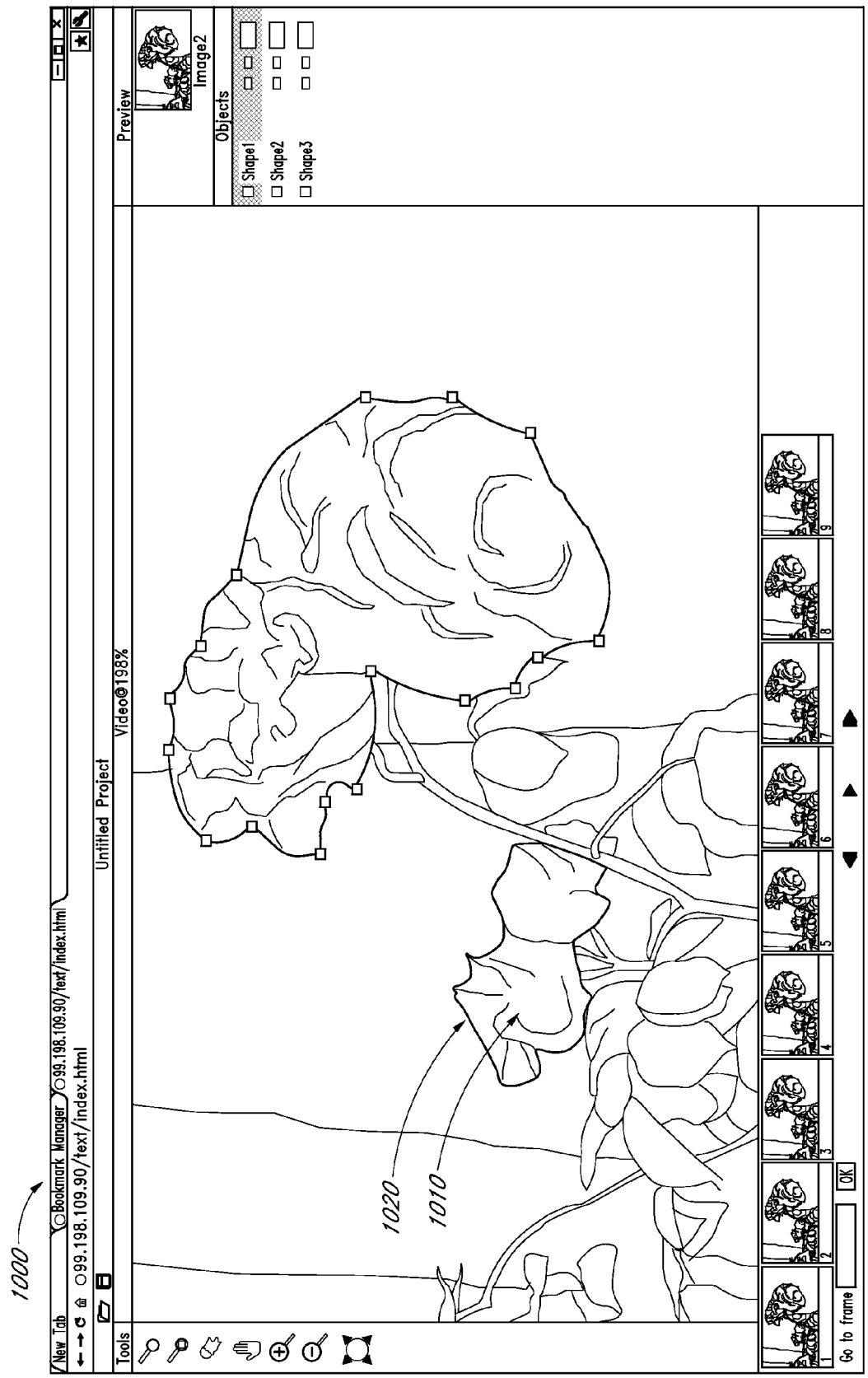

FIG. 8 depicts an embodiment of a project management user interface 800 that can enable an administrator to break a video into different levels of detail for assignment to workers. For example, the administrator may be able to divide a video into reels, scenes, shots, key frames, frames, etc. The interface 800 further displays the code, name, client, desired or required delivery date, and creation date. FIG. 9 illustrates an example worker user interface 900 that enables a worker to select frames (e.g., with controls 910) assigned to the worker for processing. The interface 900 further displays the code, name, client, desired or required delivery date, and creation date. FIG. 10 illustrates an example digital editor user interface 1000, which includes tools for rotoscoping. As shown, an outline 1020 (also referred to as a "tracing") drawn around an image 1010 as a series of line segments by a working in the rotoscoping process.

Figure 11:
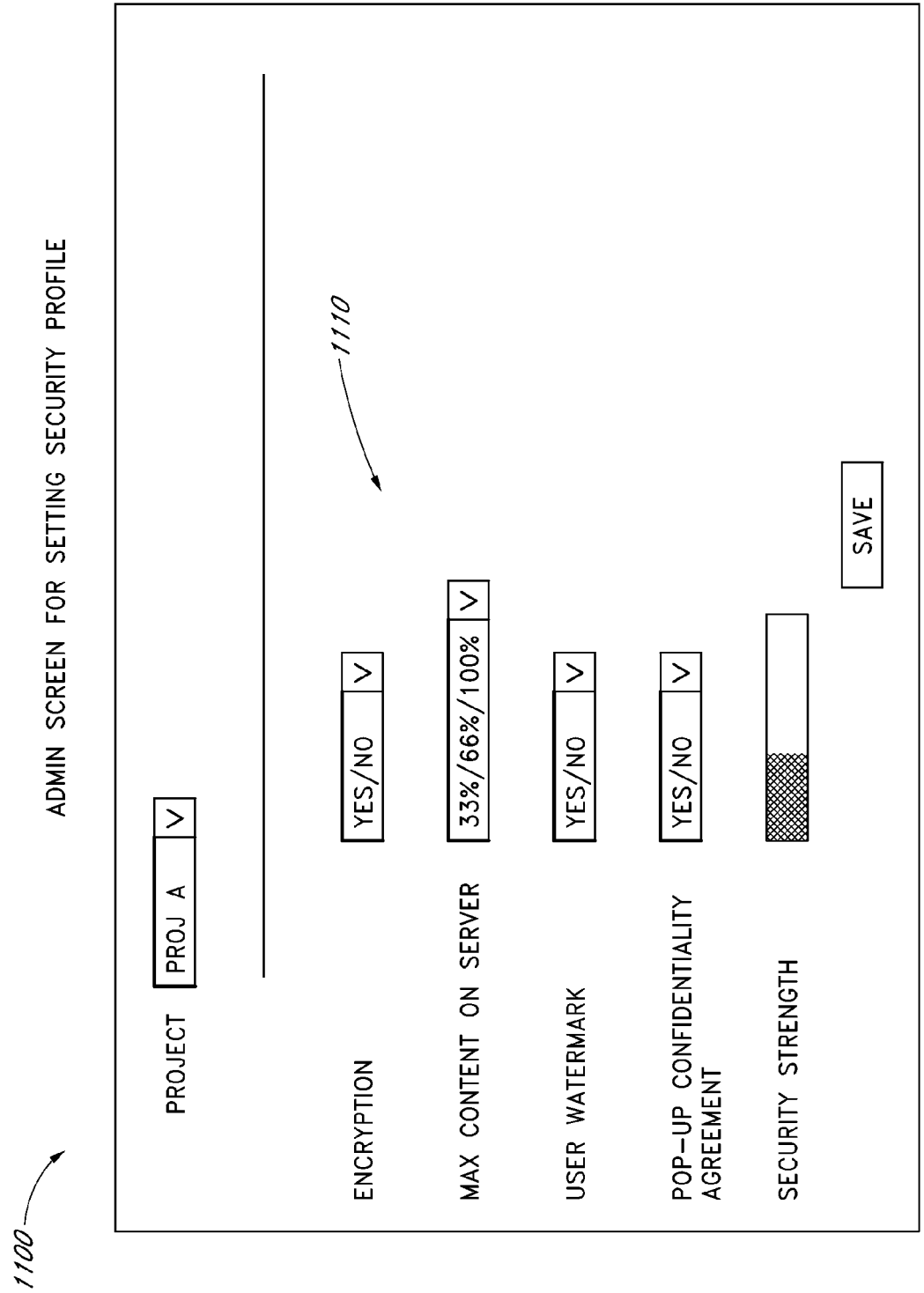

FIG. 11 illustrates an example administrative user interface 1100 that includes controls 1110 for adjusting a video's security settings. The example settings included in the depicted embodiment include whether to use encryption, a maximum desired content of a movie to store on any given server, whether to use watermarks, a security strength or level of a movie, and whether to use a pop-up confidentiality agreement (similar to a click-wrap license).

Figure 12:
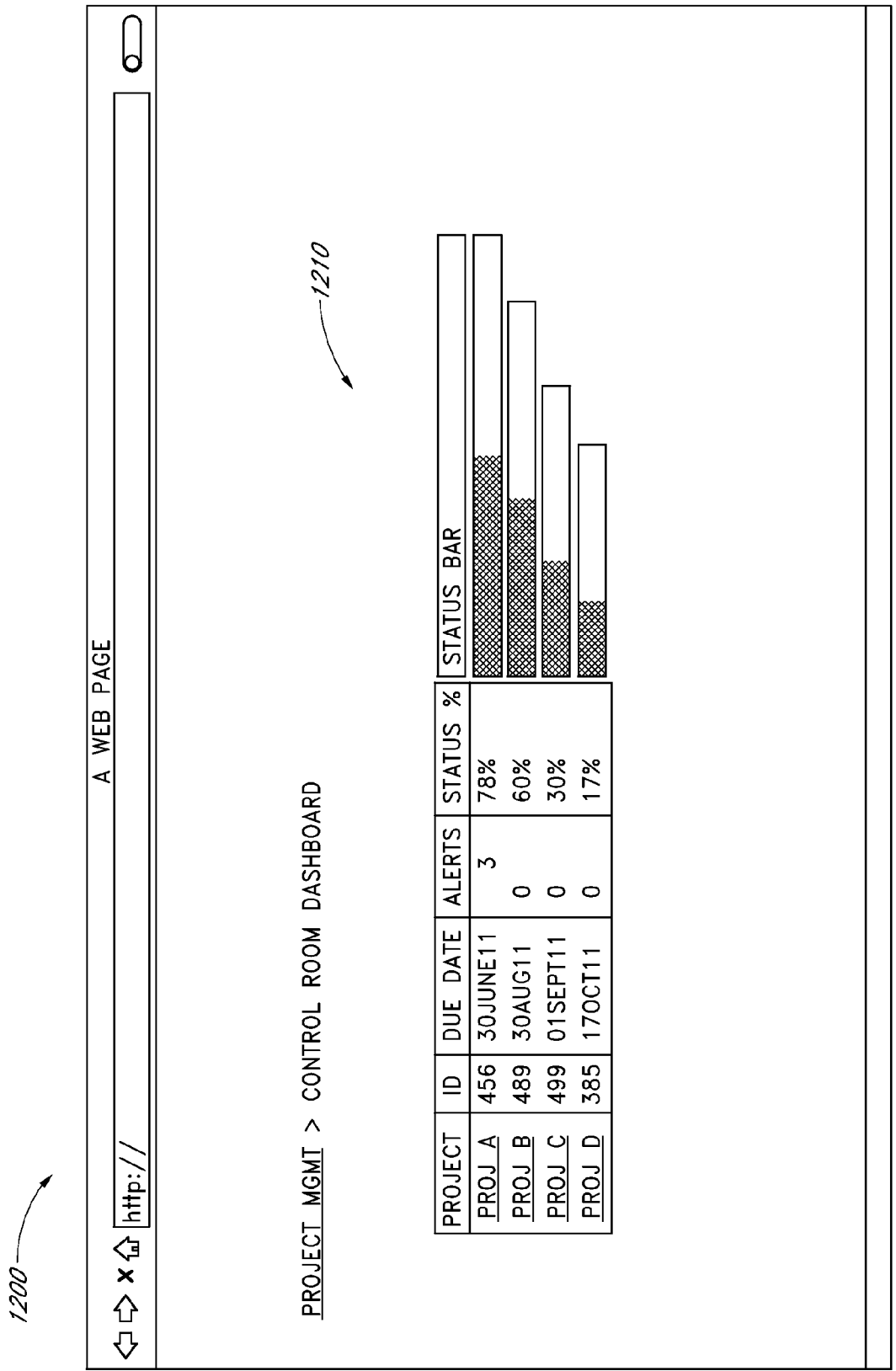

FIG. 12 illustrates an example control room user interface 1200 that provides status information 1210 on projects being worked on by workers. This status information includes, in the depicted embodiment, project IDs, their due dates, their completion percentages, and any alerts regarding potential problems on those projects. As an example, an alert might include information regarding a particularly challenging scene for rotoscoping, such as a person jumping through a glass wall. The alert can bring the difficult rotoscoping (or other) project to a manager's attention. The manager may then decide how to address the situation, for example, by allocating more quality control workers for the scene, obtaining more workers, or the like.

Further, although not shown, one or more user interfaces can also be provided for a client or customer to access the adaptive workflow system 210 and/or project network application 220. These user interfaces can include an intake user interface that enables a client to specify parameters of a project, such as its due date, the client's preference on notifications (such as how often to be updated on the status of the project), payment information or a purchase order, and the like. Another user interface that can be provided by the adaptive workflow system 210 can be a review user interface, where a client reviews reference frames or other frames. The user interface may provide functionality for the client to mark up a frame to indicate corrections or desired additional rotoscoping or the like.

V. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 110 or 210 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of performing computer-aided video image processing, the method comprising:
    receiving a video comprising a plurality of video frames;
    programmatically assigning processing of the video frames to a plurality of workers;
    electronically inserting digital watermarks in at least some of the video frames, the digital watermarks comprising references to the workers assigned to process the video frames;
    providing a network application having functionality for allocating compressed versions of the video frames to worker systems operated by the plurality of workers over a network, the network application configured to:
        output a digital video editor user interface comprising functionality for the workers to perform at least a part of a two-dimensional to three-dimensional conversion process on the compressed video frames, the two-to-three dimensional conversion process comprising performing two or more of the following: rotoscoping, depth mapping, occlusion filling, pixel shifting, three dimensional modeling, and camera matching, and
        collect processed frame information from the worker systems; and
    providing the processed frame information to a provider of the video as part of at least partially two-dimensional to three-dimensional converted video;
    wherein at least said providing the network application is implemented at least in part by a computer system comprising computer hardware.

2. The method of claim 1, wherein the digital video editor user interface further comprises functionality for the workers to perform the rotoscoping, the depth mapping, and the occlusion filling.

3. The method of claim 1, further comprising providing a user interface that allows an administrator to monitor progress of the workers in editing the video frames.

4. The method of claim 1, further comprising rating performance of the workers based on the collected processed frame information.

5. The method of claim 4, wherein said rating comprises evaluating the workers based on one or more of the following factors: timeliness, editing quality, thoroughness, availability, and rate.

6. The method of claim 5, wherein the factors further comprise professionalism and infrastructure of the worker systems.

7. The method of claim 1, further comprising encrypting the frames so that transmission of the encrypted frames to the worker systems from the network application reduces a risk of obtaining actual frames from the encrypted frames.

8. The method of claim 7, wherein the worker systems comprise functionality to decrypt a portion of each frame while editing each frame so that not all of a frame is decrypted at any given time.

9. The method of claim 1, wherein the computer system comprises a plurality of computing devices.

10. Non-transitory physical computer storage comprising instructions stored thereon for implementing, in one or more processors, operations for performing computer-aided video image processing, the operations comprising:
    receiving a video comprising a plurality of video frames;
    programmatically assigning processing of the video frames to a plurality of workers;
    electronically inserting digital watermarks in at least some of the video frames, the digital watermarks comprising references to the workers assigned to process the video frames;
    providing a network application having functionality for allocating compressed versions of the video frames of the video to worker systems operated by the plurality of workers over a network, the network application configured to:
        output a digital video editor user interface comprising functionality for the workers to perform at least a part of a two-dimensional to three-dimensional conversion process on the compressed video frames, the two-to-three dimensional conversion process comprising performing two or more of the following: rotoscoping, depth mapping, occlusion filling, pixel shifting, three dimensional modeling, and camera matching, and
        collect processed frame information from the worker systems; and
    providing the processed frame information to a provider of the video as part of an at least partially two-dimensional to three-dimensional converted video;
    wherein at least said providing the network application is implemented by a computer system comprising computer hardware.

11. The non-transitory physical computer storage of claim 10, wherein the digital video editor user interface further comprises functionality for the workers to perform the rotoscoping, the depth mapping, and the occlusion filling.

12. The non-transitory physical computer storage of claim 10, wherein the operations further comprise providing a user interface that allows an administrator to monitor progress of the workers in editing the video frames.

13. The non-transitory physical computer storage of claim 10, wherein the operations further comprise rating performance of the workers based on the collected processed frame information.

14. The non-transitory physical computer storage of claim 13, wherein said rating comprises evaluating the workers based on one or more of the following factors: timeliness, editing quality, thoroughness, and availability.

15. The non-transitory physical computer storage of claim 10, in combination with a computer system comprising computer hardware.

16. The non-transitory physical computer storage of claim 10, wherein the operations further comprise compressing the frames.

17. The non-transitory physical computer storage of claim 10, wherein the digital watermarks comprising references to the workers assigned to process the frames.

18. A system for computer-aided video image processing, the system comprising:

a network application comprising computer hardware, the network application comprising functionality for:
  receiving a video comprising a plurality of video frames;
  programmatically assigning processing of the video frames to a plurality of workers;
  electronically inserting digital watermarks in at least some of the video frames, the digital watermarks comprising references to the workers assigned to process the video frames;
  allocating compressed versions of the video frames to the worker systems operated by the plurality of workers over a network, the network application configured to:
  output a digital video editor user interface comprising functionality for the workers to perform at least a part of a two-dimensional to three-dimensional conversion process on the compressed video frames, the two-to-three dimensional conversion process comprising performing two or more of the following: rotoscoping, depth mapping, occlusion filling, pixel shifting, three dimensional modeling, and camera matching, and
  collect processed frame information from the worker systems; and a project management module configured to provide the processed frame information to a provider of the video as part of at least partially two-dimensional to three-dimensional converted video.

19. The system of claim 18, wherein the digital video editor user interface further comprises functionality for the workers to perform the rotoscoping, the depth mapping, and the occlusion filling.

20. The system of claim 18, wherein the project management module is further configured to provide a user interface that allows an administrator to monitor progress of the workers in editing the video frames.

21. The system of claim 18, further comprising a worker ratings module configured to rate performance of the workers based on the collected processed frame information.

22. The system of claim 21, wherein the worker ratings module is further configured to rate the performance by at least evaluating the workers based on one or more of the following factors: timeliness, editing quality, thoroughness, and availability.

23. The system of claim 18, wherein digital video editor interface is configured to be output on a 3-D enabled display, thereby enabling a worker to evaluate the quality of the processed frame information.

24. The system of claim 18, wherein the compressed and watermarked frames comprises digital watermarks that reference the workers.

* * * * *